United States Patent
Schmitz

(10) Patent No.: US 6,253,460 B1
(45) Date of Patent: Jul. 3, 2001

(54) APPARATUS FOR POSITION MEASUREMENT AND A SYSTEM AND A METHOD FOR USING THE SAME

(76) Inventor: Geoffrey W. Schmitz, 413 Lasalle St., Wausau, WI (US) 54403

( * ) Notice: Subject to any disclaimer, the term of this patent is extended or adjusted under 35 U.S.C. 154(b) by 0 days.

(21) Appl. No.: 09/329,484

(22) Filed: Jun. 10, 1999

(51) Int. Cl.[7] ................. G01B 7/14; G01B 7/30
(52) U.S. Cl. ................. 33/706; 33/708; 33/710; 33/707; 324/207.22; 324/207.24
(58) Field of Search ............... 33/706, 707, 708, 33/710; 324/207.22, 207.24

(56) References Cited

U.S. PATENT DOCUMENTS

| | | | |
|---|---|---|---|
| 3,036,266 | * | 5/1962 | Hulls .............................. 324/207.22 |
| 3,930,201 | * | 12/1975 | Ackermann et al. ........... 324/207.22 |
| 4,103,222 | * | 7/1978 | Phillips et al. .................. 324/207.22 |
| 4,471,304 | * | 9/1984 | Wolf ................................ 324/207.24 |
| 4,833,919 | * | 5/1989 | Saito et al. ...................... 324/207.22 |
| 5,130,649 | * | 7/1992 | Kumagai ......................... 324/207.22 |
| 5,742,161 | * | 4/1998 | Karte .............................. 324/207.22 |
| 6,124,709 | * | 9/2000 | Allwine .......................... 324/207.22 |
| 6,137,288 | * | 10/2000 | Luetzow ......................... 324/207.22 |

FOREIGN PATENT DOCUMENTS

| | | | |
|---|---|---|---|
| 3210716 | * | 11/1982 | (DE) ............................... 324/207.22 |
| 0042003 | * | 2/1987 | (JP) ................................ 324/207.22 |

OTHER PUBLICATIONS

Feedback Control of Dynamic Systems, Franklin et al., Addison–Wesley Co.,Reading Mass. pp. 17–31, May 1987.*

* cited by examiner

Primary Examiner—Randy W. Gibson
(74) Attorney, Agent, or Firm—Patents+TMS

(57) ABSTRACT

An apparatus, system and method for determining the position for translating, rotating and complex motion generating shaft elements are provided. A layer may be deposited over an exterior surface of the shaft element containing a known surface geometry to provide for monitoring displacement using one or more proximity sensors. The proximity sensor detects any change in the distance between the sensor and the exterior surface geometry of the shaft element. The shaft element may alternatively be magnetized for use with magnetic sensors. The gap dimension is proportional to and/or indicative of the absolute position.

20 Claims, 4 Drawing Sheets

APPARATUS FOR POSITION MEASUREMENT AND A SYSTEM AND A METHOD FOR USING THE SAME

BACKGROUND OF THE INVENTION

The present invention generally relates to a position measurement apparatus, system and method. More specifically, the present invention relates to a non-contact, no-wear monitor capable of measuring the position of translating, rotating and complex motion machine elements including, but not limited to, hydraulic cylinders, pistons and other like devices. In addition, the present invention provides a system and method for measuring machine elements using the non-contact, no-wear monitor.

It is, of course, generally known to monitor the displacement of machine elements. However, it is often difficult to determine the relative and absolute position of hydraulic cylinders, pistons and other like devices. Known monitoring systems of cylinders, pistons and other like devices utilize a sensor whereby contact is made between the monitor and the moving machine element. As a result, parts of the known monitoring systems tend to wear quickly and often require replacement. Further, as those parts wear, accuracy of measurements decreases.

In addition, displacement monitors that contact machine elements tend to interfere with the normal application of bearings and supporting machine elements. Also, typical contact measuring devices have difficulty operating in oil or oil-contaminated environments.

Furthermore, present contact and non-contact monitoring systems depend on an initial calibration in order to measure relative and absolute displacements. Also, present monitoring systems require activation with electrical power to maintain an absolute reference.

A need, therefore, exists for an improved displacement monitoring device, system and method for translating, rotating and complex motion generating elements that overcome the deficiencies of known devices, systems and methods.

SUMMARY OF THE INVENTION

The present invention provides a position measurement apparatus, system and method for measuring the position of translating, rotating and other complex motion generating machine elements including, but not limited to, hydraulic cylinders, pistons and other like devices. Applications of the present invention can be utilized in rugged defense industrial construction, truck, commercial, agricultural, automotive and other like applications.

To this end, in an embodiment of the present invention, an apparatus is provided for measuring displacement. The apparatus has a machine element and a shaft element that moves within the machine element. A core has a non-uniform surface inside the shaft element and a layer on the surface of the core provides a uniform surface of the shaft element. A sensor is provided for detecting the non-uniform surface of the core without contacting the shaft element.

In an embodiment, the sensor detects a distance between the sensor and the non-uniform surface of the core.

In an embodiment, a taper on an exterior of the core surface extends from a first end of the core to a second end of the core.

In an embodiment, repetitive exterior contour features are provided on the core that are capable of being sensed by the sensor. The repetitive exterior contours form a pattern on an exterior of the core running a length of the core.

In an embodiment, the repetitive exterior contour has an amplitude wherein the sensor detects a change in a distance between the sensor and the core surface.

In an embodiment, an eccentric surface on the core is capable of being detected by the sensor.

In an embodiment, the shaft element rotates within the shaft element.

In an embodiment, a base is provided on an end of the machine element through which the shaft element moves.

In an embodiment, the sensor is located within the base of the shaft element.

In an embodiment, a second sensor is provided for detecting the non-uniform surface of the core without contacting the shaft element.

In an embodiment, the core is made of a magnetic material producing a magnetic field.

In another embodiment of the present invention, a system is provided for measuring displacement. The system has a machine element and a shaft element that moves within the machine element. A sensor is capable of measuring displacement of the shaft element as the shaft element moves within the machine element. The sensor is capable of producing a signal representative of the displacement and does not contact the shaft element. A display means is provided to receive the signal and to provide an output of the displacement of the shaft element.

In an embodiment, a processing means receives the signal from the proximity sensor.

In an embodiment, the processing means may calculate a position, velocity and/or acceleration of the shaft element within the machine element.

In another embodiment of the present invention, a method is provided for measuring displacement. The method comprises the steps of: providing a machine element; providing a shaft element capable of moving within the machine element; providing a proximity sensor capable of measuring the displacement of the shaft element wherein the proximity sensor does not contact the shaft element; moving the shaft element; measuring the displacement of the shaft element with the proximity sensor; and producing an output signal as the shaft element moves within the shaft element.

In an embodiment, the output signal is fed into a processing unit that generates a second output signal and displays the second output signal.

In an embodiment, the output signal is fed into the processing unit to calculate shaft element position, velocity and/or acceleration.

It is, therefore, an advantage of the present invention to provide a measurement apparatus, system and method for translating, rotating and complex motion generating machine elements including hydraulic cylinders, pistons and other like devices known in the art.

Another advantage is to provide a measurement apparatus, system and method able to provide feedback to a central processing unit, stand-alone electronic control or provide a direct reference signal indicating absolute machine element position.

And, another advantage of the present invention is to provide a measurement apparatus, system and method that, with manipulation and the optional addition of a clock reference, permits measuring of element velocity and/or acceleration.

A further advantage of the present invention is to provide a measurement apparatus, system and method that may be installed in new machine elements or even retrofit to existing applications.

A still further advantage of the present invention is to provide a measurement apparatus, system and method whereby the surface of the sensed element includes a compound geometry such as an eccentric or tapered or faceted surface to permit measuring both linear displacement and/or rotary and/or angular displacement simultaneously.

And, another advantage of the present invention is to provide multiple sensors that may be distributed about the machine elements to provide means for correcting error.

And, another advantage of the present invention is to provide a measurement apparatus, system and method for measuring linear and/or rotary displacement that does not interfere with the normal application of bearings and supporting machine elements and permits normal assembly.

And, another advantage of the present invention is to provide a measurement apparatus, system and method for absolute linear and/or rotary displacement measurement not dependent on an initial calibration, but rather directly and absolutely fixed to the component geometry.

Moreover, an advantage of the present invention is to provide a "non-contact" measurement apparatus, system and method for linear and/or rotary displacement measurement with no wear possible between the sensor and the measured machine element.

A further advantage of the present invention is to provide a measurement apparatus, system and method for measuring linear and/or rotary displacement that uses the machine element as part of the measuring device.

A further advantage of the present invention is to provide a measurement apparatus, system and method for measuring linear and/or rotary displacement of hydraulic cylinders, air-cylinders, guides, ways, slides, machine tool elements, transducers, threaded shafts, pistons, cranks, flywheels and other like devices known in the art.

A still further advantage of the present invention is to provide a measurement apparatus, system and method for measuring linear and angular displacement that, in its application, simultaneously provides for protection and/or corrosion resistance to underlying elements.

A still further advantage of the present invention is to provide a measurement apparatus, system and method for measuring linear and angular displacement that, in its application, presents a reduced friction, uninterrupted surface for impinging bearings and seals.

And, another advantage of the present invention is to provide a measurement apparatus, system and method for measuring linear and/or angular displacement using a variety of proximity sensors including, but not limited to, eddy current, ultrasonic, inductive, magnetic, Hall-effect sensors, internal magnetic sensors and other like sensors.

A further advantage of the present invention is to provide a feedback gain that may change due to a change of the surface of the machine element whereby a higher gain is obtained when the sensor senses an underlying taper or known markings on the element surface.

A further advantage of the present invention is to provide a measurement apparatus, system and method that may be applied to other shapes including spheres and irregular shapes whereby a sensor senses a known machine element surface.

A still further advantage of the present invention is to provide a measurement apparatus, system and method for sensing a travel end limit.

Yet another advantage of the present invention is to provide a measurement apparatus, system and method whereby the sensors do not need to be activated or supplied with electrical power to maintain an absolute reference.

A further advantage of the present invention is to provide a measurement apparatus, system and method able to operate submerged in oil, or in oil-contaminated environments such as, for example, inside a hydraulic cylinder.

A still further advantage of the present invention is to provide a measurement apparatus, system and method where the outer coating of a machine element is magnetic or contains magnetized particles over a tapered or varying underlying surface to present a varying magnetic flux to a magnetic proximity or other magnetic sensitive sensor.

And, another advantage of the present invention is to provide a measurement apparatus, system and method for measuring the position of cylinder rams where the proximity sensor may be located within the cylinder body or external to the cylinder body and end-fittings.

And, a further advantage of the present invention is to provide a measurement apparatus, system and method having no intrinsic moving parts whereby any moving parts are limited to the motion of the measured machine element.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention provides a measurement apparatus for determining the absolute and/or relative position for translating, rotating and/or complex motion generating machine elements. In addition, the present invention provides a system and a method for determining the position of complex motion generating machine elements. To this end, a measurement apparatus device combines a non-contact sensor with a hydraulic cylinder or other like machine element.

Figure 1:
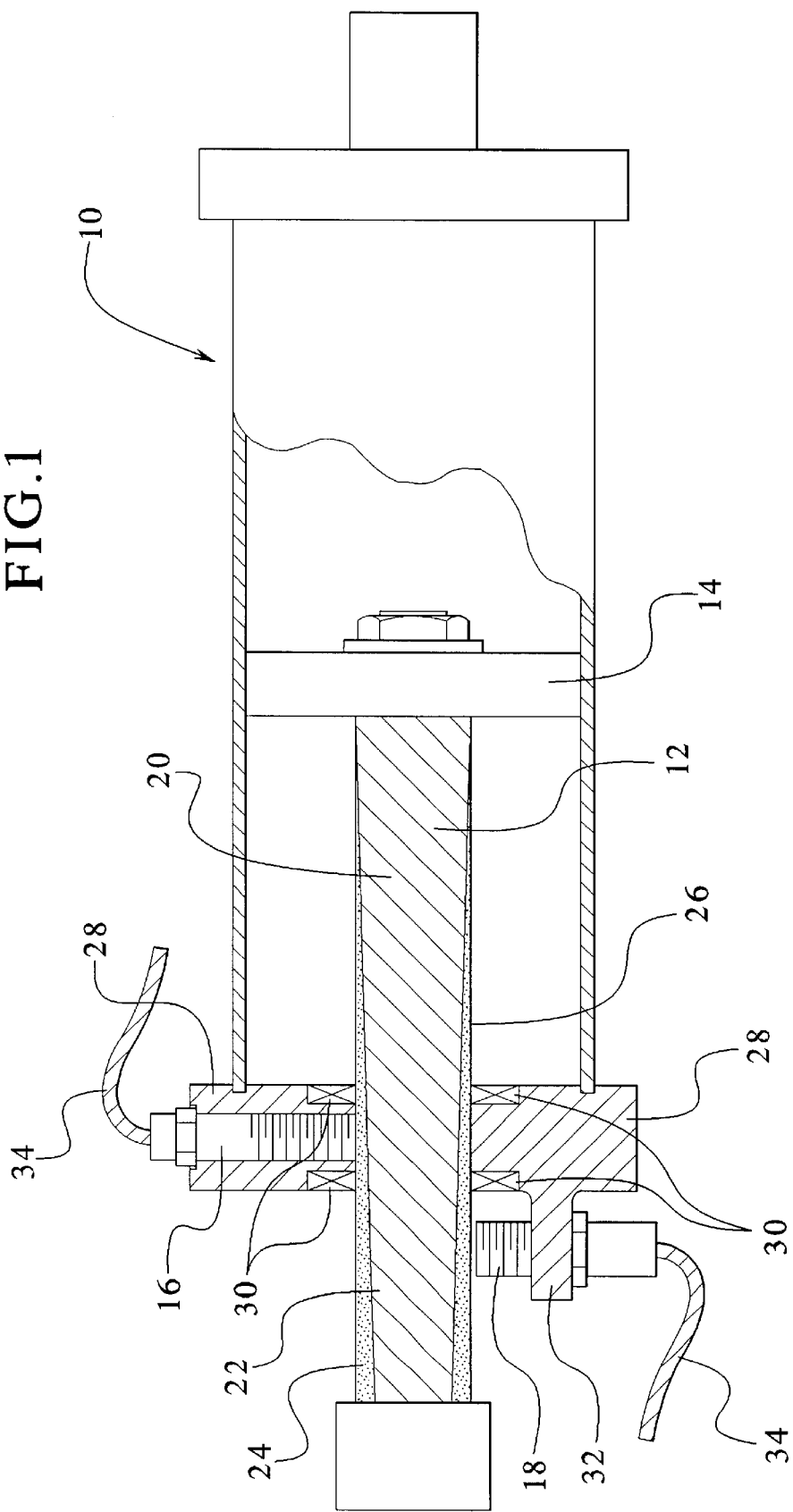
FIG. 1 generally illustrates a side view, partially in cross-section and partially broken away, of a hydraulic cylinder showing sensor placement and a tapered core in an embodiment of the present invention.

Referring now to the drawings wherein like numerals refer to like parts, FIG. 1 generally illustrates a hydraulic cylinder machine element 10 having a shaft element 12 and a head 14 that operates cooperatively with the hydraulic cylinder 10 in a manner well-known to one of ordinary skill in the art. The hydraulic cylinder 10 may have one or more proximity sensors placed around the shaft element 12. A proximity sensor 16 may be located within the body of the hydraulic cylinder 10. A proximity sensor 18 may, alternatively, be located outside the hydraulic cylinder 10.

The proximity sensors 16,18 may be provided to measure linear displacement between the sensors 16,18 and a tapered core 20 within the shaft element 12 as the core 20 and the head 14 move laterally within the cylinder 10. The proximity sensors 16,18 do not contact the shaft element 12 when measuring linear displacement of the tapered core 20. The proximity sensors 16,18 may be positioned at right angles to the shaft element 12. The tapered core 20 has a core surface 22. Alternatively, the core surface 22 may have distinctive features such that the core surface 22 may be sensed by the proximity sensors 16,18. A layer 24 is fixed or deposited on the core surface 22 providing a uniform outer surface 26 for the shaft element 12. In addition, the layer 24 may be a corrosion-resistant surface. Further, the layer 24 provides a surface having low friction and high hardness for protection in hostile environments as compared to chrome and other conventional core finishes.

Figure 5:
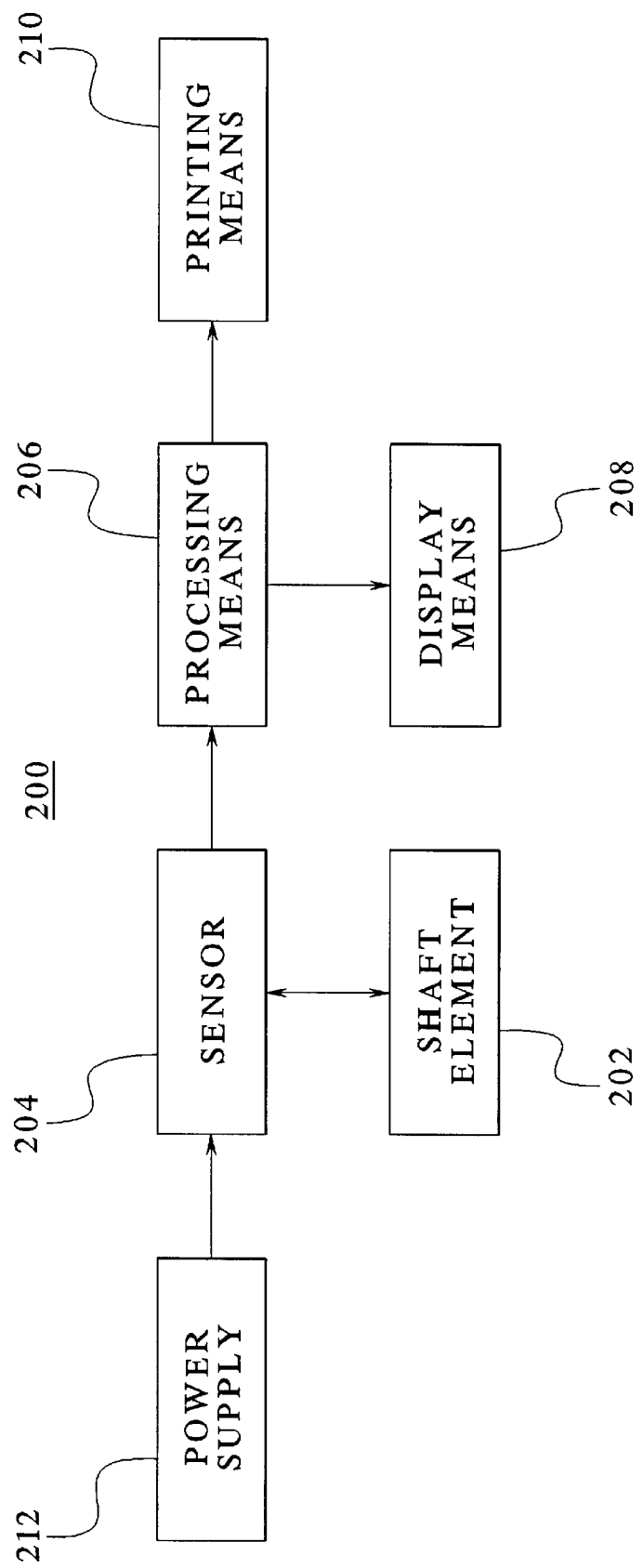
FIG. 5 illustrates a black box diagram of an embodiment of the system of the present invention.

The layer 24 may be constructed of ceramic, composite metallic, semi-metallic, non-metallic, magnetic, non-magnetic or plastic, and may be opaque, translucent or transparent. Other like materials known to one of ordinary skill in the art may also be used. Known compounds, such as the polyester composite Karon of Kaman Corporation and/or the coating Ceremax of Mannesmann-Rexroth Corporation may be utilized. The proximity sensors 16,18 may be any displacement sensor including, but not limited to, eddy current, ultrasonic, inductive, magnetic, Hall-effect, internal magnetic and other like sensors known to one having ordinary skill in the art to detect any change in the distance between the sensor and the underlying core surface 22 without contacting the shaft element 12. The proximity sensors 16,18 may be connected to a display device 208 or a central processing unit 206 as shown in FIG. 5.

The hydraulic cylinder machine element 10 contains a base 28 forming an end of the hydraulic cylinder machine element 10. Bearings 30 provide for sealing of the hydraulic cylinder and allowing for low-friction movement of the shaft element 12 within the hydraulic cylinder 10 and through the base 28. The proximity sensor 16 may be within the base 28. Alternatively, the proximity sensor 18 may be external to the base 28 but attached to the base 28 by a connector 32.

For example, in FIG. 1, the tapered core 20 may be constructed of a magnetic material. Further, the layer 24 may be constructed of a non-magnetic ceramic, composite or other like material that simultaneously provides a smooth surface and protects the tapered core 20 from corrosion and other damage from hostile environments. Alternatively, the layer 24 may be constructed of a magnetic material and the tapered core 20 may be constructed of a non-magnetic material. The proximity sensors 16,18 may be magnetic sensors capable of determining the change in distance between the sensors 16,18 and the tapered core surface 22 without contacting the shaft element 12. As the shaft element 12 moves longitudinally through the cylinder 10, the distance between the core surface 22 and either of the proximity sensors 16,18 changes linearly. The sensors 16,18 detect a change in the magnetic field around the shaft element 12 as the shaft element 12 moves through the cylinder 10.

Figure 2:
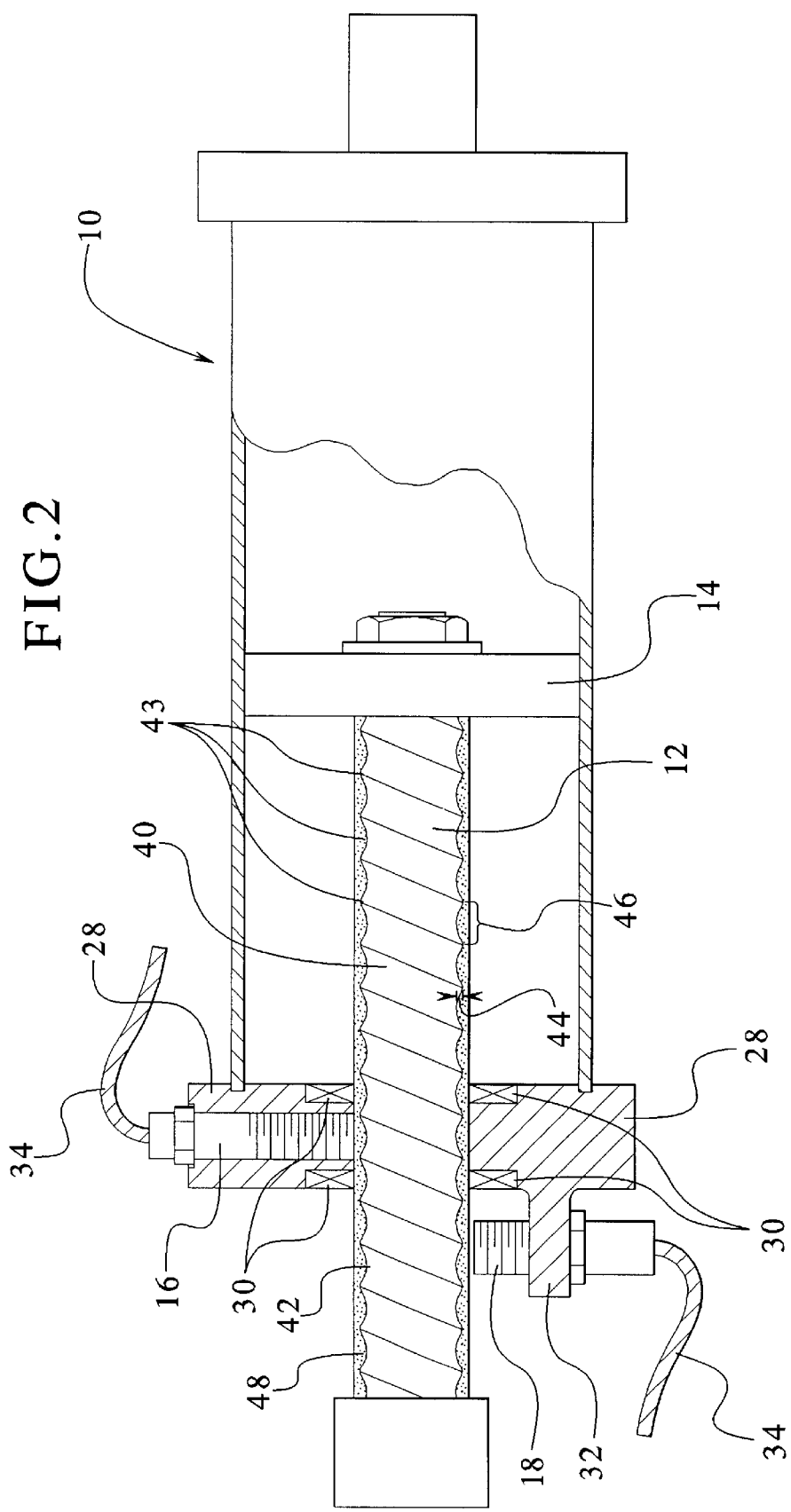
FIG. 2 illustrates a side view, partially in cross-section and partially broken away, of a hydraulic cylinder showing sensor placement with a distinctly marked core surface in an embodiment of the present invention.

FIG. 2 illustrates another embodiment of the present invention showing the hydraulic cylinder 10 having the shaft element 12 and the head 14 with the proximity sensors 16,18. The shaft element 12 is constructed of a core 40 formed with a distinctive, characteristic core surface 42 over its working surface length. A layer 48 is fixed or deposited on the core surface 42 providing a uniform outer surface 26 for the shaft element 12. In addition, the layer 48 may be a corrosion-resistant material 43. The core surface 42 may have a repetitive exterior contour such as wave-like features with distinctions in amplitude 44 and/or frequency 46. Further, the layer 48 provides a surface having low friction and high hardness. Known compounds such as the polyester composite Karon of Kaman Corporation and/or the ceramic core coating Ceremax of Mannesmann-Rexroth Corporation may be utilized for this purpose. The proximity sensors 16,18 may be any non-contact sensor including, but not limited to, eddy current, ultrasonic, inductive, magnetic, Hall-effect, internal magnetic and other like devices known to one having ordinary skill in the art to detect any change in the distance between the sensors 16,18 and the underlying core surface 42 without contacting the shaft element 12.

For example, in FIG. 2, the proximity sensors 16,18 collect signals indicative of the distance between the sensors 16,18 and the core surface 42. A change in the position of the shaft element 12 modifies the distance between the proximity sensors 16,18 and the core surface 42, changing the characteristic output signal of the proximity sensors 16,18 in proportion to the known underlying geometry of the core surface 42, which, in turn, is referenced to the absolute linear position of the shaft element 12. Optionally, multiple sensors may be positioned around the shaft element 12 to compensate for any error in the sensors 16,18. A central processing unit 206 may be employed to interpret and/or process the signal from the proximity sensors 16,18 as shown in and will be described hereinafter with reference to FIG. 5.

Figure 3:
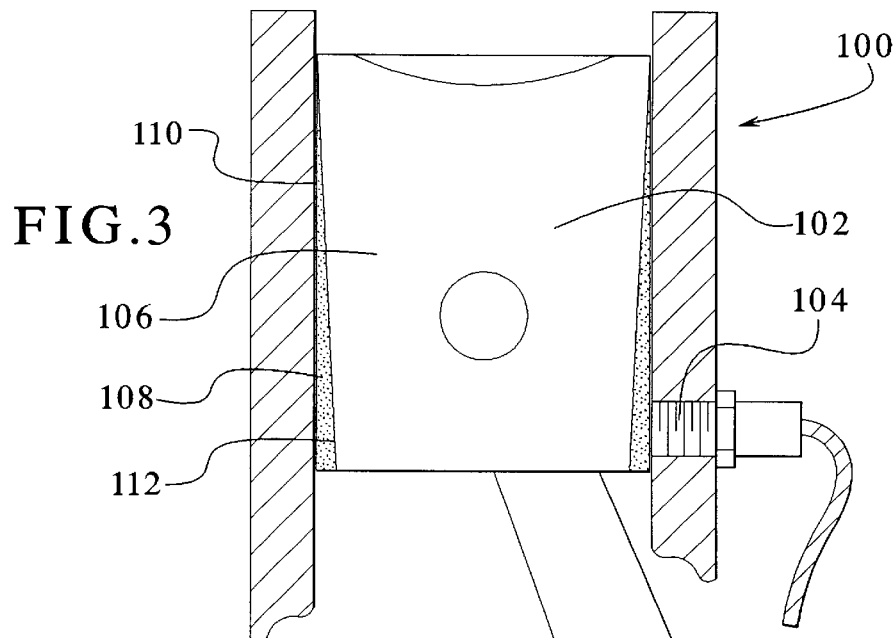
FIG. 3 illustrates a side view, partially in cross-section and partially broken away, of a reciprocating piston with a tapered core in an embodiment of the present invention.

FIG. 3 shows a reciprocating piston 100 having a piston element 102. A proximity sensor 104 is located at a right angle to the piston element 102 without contacting the piston element 102. The piston element 102 may be formed from a core 106 and a layer 108 deposited over the core 106 to present a smooth, corrosion-resistant outer surface 110 for the piston element 102. The core 106 has a tapered surface 112.

The proximity sensor 104 may be connected to a power supply 212 and a means for processing 206 and/or receiving signals from the proximity sensor 104 indicative of the distance between the sensor 104 and the piston element 112 as shown in FIG. 5.

For example, in FIG. 3, the core 106 may be constructed of a magnetic material. The layer 108 may be constructed of a non-magnetic composite material or ceramic layer incapable of being detected by the proximity sensor 104 that covers the tapered core surface 112 to provide an uninterrupted, non-tapered uniform outside surface. The proximity sensor 104 may be a linear Hall-effect sensor, such as that manufactured by Sensor Solution Corporation. A change in the position of the element 106 modifies the distance between the magnetic core surface 112 and the sensor 104, which, in turn, changes the magnetic flux of the magnetic core surface 112. This changes the output signal of the proximity sensor 104 in proportion to the absolute linear displacement of the piston element 102.

Optionally, multiple sensors may be applied around the piston or other like machine element to compensate for error.

Figure 4:
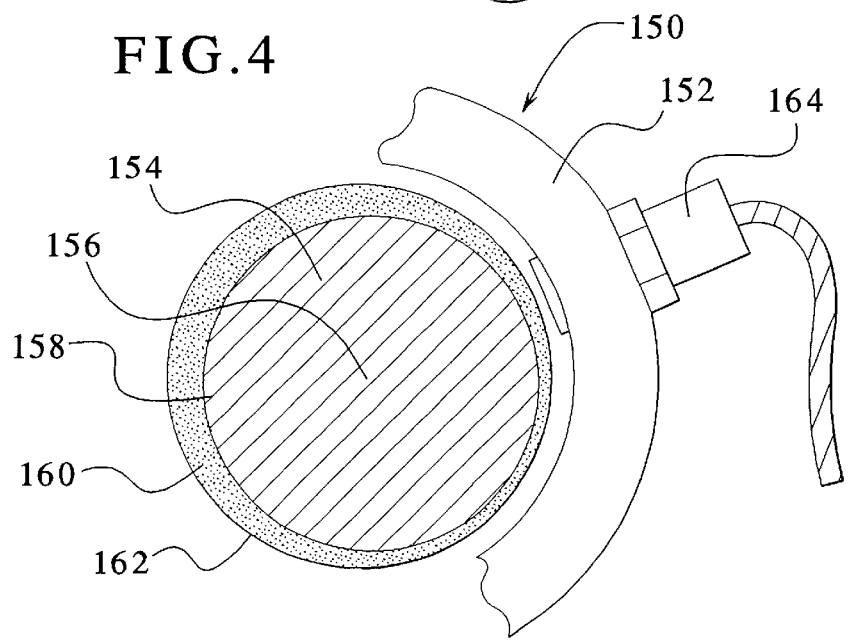
FIG. 4 illustrates a side view, partially in cross-section and partially broken away, of a rotary shaft with a proximity sensor to detect angular position and/or rotation with an eccentric underlying surface in an embodiment of the present invention.

FIG. 4 shows a rotary shaft 150 with a supporting frame 152 and a rotating machine element 154. The rotating machine element 154 is formed with a core 156 having an eccentric surface 158. A layer 160 is deposited over the eccentric surface 158 to present an uninterrupted, non-eccentric, uniformly cylindrical surface 162. A proximity sensor 164 may be located at a right angle to the machine element 154 without contacting the rotating machine element 154. The proximity sensor 164 is connected to a power supply 212 and a means for processing and/or receiving signals (not shown) from the proximity sensor 164 indicative of the distance between the sensor 164 and the eccentric surface 158 as shown in FIG. 5. As the machine element 154 rotates, the distance between the proximity sensor 164 and the eccentric surface 158 changes the output signal of the proximity sensor 164 in proportion to the rotary displacement.

Optionally, multiple sensors may be positioned around the machine element 154 to compensate for error.

FIG. 5 illustrates, in a black box diagram, an embodiment of a system 200 of the present invention. The system 200 of the present invention includes a shaft element 202 and a proximity sensor 204 which may be any of such embodiments illustrated in any one of FIGS. 1–4. The proximity sensor 204 detects the movement of the shaft element 202. The output signal of the sensor 204 is fed into a processing means 206 for signal interpretation and/or processing. The processing means 206 may include means for interpreting absolute or relative position of the shaft element 202. Alternatively, the processing means 206 may interpret shaft element velocity and acceleration of the shaft element 22 as well as position thereof.

A display unit 208 may be provided to display the absolute or relative position of the sensed shaft element 202. The display unit 208 may also show the velocity and/or acceleration of the sensed shaft element 202 as well as absolute and/or relative position. A printer 210 may also be provided to print the results of the absolute, relative position of the shaft element 202 and/or the velocity and/or acceleration of the shaft element 202. A power supply 212 may provide power to the sensor 244, the processing means 206, the display unit 208 and/or the printer 210.

Optionally, the output signal of the proximity sensor 204 may be fed into a stand-alone electronic control or provide a direct reference signal indicating absolute shaft element position.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An apparatus for measuring displacement, the apparatus comprising:
   a machine element;
   a shaft element that moves linearly within the machine element;
   an integrally formed core having a non-uniform surface inside the shaft element;
   a layer on the surface of the core in continuous contact with the shaft element to provide a uniform surface of the shaft element; and
   a sensor for detecting the non-uniform surface of the core without contacting the shaft element.

2. The apparatus of claim 1 wherein the sensor detects a distance between the sensor and the non-uniform surface of the core.

3. The apparatus of claim 1 further comprising:
   a taper on an exterior of the core surface extending from a first end of the core to a second end of the core.

4. The apparatus of claim 1 further comprising:
   repetitive exterior contour features on the core that are capable of being sensed by the sensor.

5. The apparatus of claim 1 further comprising:
   a repetitive exterior contour forming a pattern on an exterior of the core running a length of the core.

6. The apparatus of claim 5 wherein the repetitive exterior contour has an amplitude wherein the sensor detects a change in a distance between the sensor and the core surface.

7. The apparatus of claim 1 further comprising:
   an eccentric surface on the core capable of being detected by the sensor.

8. The apparatus of claim 1 wherein the shaft element rotates within the machine element.

9. The apparatus of claim 1 further comprising:
   a base on an end of the machine element through which the shaft element moves.

10. The apparatus of claim 9 wherein the sensor is located within the base of the shaft element.

11. The apparatus of claim 1 further comprising:
    a second sensor for detecting the non-uniform surface of the core without contacting the shaft element.

12. The apparatus of claim 1 wherein the core is made of a magnetic material producing a magnetic field.

13. A system for measuring displacement, the system comprising:
    a machine element;
    a shaft element that moves linearly within the machine element;
    an integrally formed core having a non-uniform surface inside the shaft element;
    a layer on the surface of the core in continuous contact with the shaft element to provide a uniform surface of the shaft element;
    a sensor capable of measuring displacement of the shaft element as the shaft element moves within the machine element and further wherein the sensor is capable of producing a signal representative of the displacement and further wherein the sensor does not contact the shaft element; and
    a display means to receive the signal and to provide an output of the displacement of the shaft element.

14. The system of claim 13 further comprising:
    a processing means receiving the signal from the proximity sensor.

15. The system of claim 14 wherein the processing means calculates a position of the shaft element within the machine element.

16. The system of claim 14 wherein the processing means calculates a velocity of the shaft element.

17. The system of claim 14 wherein the processing means calculates an acceleration of the shaft element.

18. A method for measuring displacement, the method comprising the steps of:
    providing a machine element;
    providing a shaft element capable of moving linearly within the machine element;
    providing an integrally formed core having a non-uniform surface inside the shaft element;
    providing a layer on the surface of the core in continuous contact with the shaft element to provide a uniform surface of the shaft element;

providing a proximity sensor capable of measuring the displacement of the shaft element wherein the proximity sensor does not contact the shaft element;

moving the shaft element;

measuring the displacement of the shaft element with the proximity sensor; and producing an output signal as the shaft element moves within the machine element.

19. The method of claim 18 further comprising the steps of:

feeding the output signal into a processing unit generating a second output signal; and displaying the second output signal.

20. The method of claim 19 further comprising the step of:

feeding the output signal into the processing unit to calculate shaft element position, velocity or acceleration.

* * * * *